United States Patent [19]

Riley

[11] 4,074,346
[45] Feb. 14, 1978

[54] POWER SUPPLY PROTECTIVE CIRCUIT

[75] Inventor: John A. Riley, Williamsville, N.Y.

[73] Assignee: Westinghouse Electric Corporation, Pittsburgh, Pa.

[21] Appl. No.: 685,825

[22] Filed: May 13, 1976

[51] Int. Cl.² .......................................... H02M 1/18
[52] U.S. Cl. ...................................... 363/50; 363/54; 363/87; 363/24
[58] Field of Search ................ 321/5, 11–14, 321/18; 323/9, 24, 45, 119; 363/50, 52, 53, 54, 87, 129

[56] References Cited

U.S. PATENT DOCUMENTS

| 3,456,133 | 7/1969 | Warren | 323/24 X |
| 3,697,855 | 10/1972 | Kernick et al. | 321/9 A |
| 3,829,794 | 8/1974 | Gautherin | 331/113 A |
| 3,877,896 | 4/1975 | Muskovac | 323/24 X |

FOREIGN PATENT DOCUMENTS

| 2,050,368 | 4/1970 | Germany | 323/24 |

Primary Examiner—William M. Shoop
Attorney, Agent, or Firm—C. M. Lorin

[57] ABSTRACT

In a high current power supply controlled by thyristors mounted in antiparallel in the primary of the power transformers, saturation of the transformers is prevented by a detection circuit responsive to an unbalance in such bilateral switch and protective action is automatically triggered. Display is provided to identify the defective bilateral switch.

9 Claims, 4 Drawing Figures

POWER SUPPLY PROTECTIVE CIRCUIT

BACKGROUND OF THE INVENTION

The invention relates to thyristor installations for the supply of electrical energy under low voltage and very high current to a load consisting for instance of a rectifying unit and a melting metal cell. In such installations thyristors are used to control the power delivered to the load. Such thyristors are used in the primary circuit of a power transformer having the low voltage load in the secondary. Two paired antiparallel thyristors are generally associated to control the power output in each alternance to the primary side of the transformer by controlling the firing angle of conduction of such bilateral switch.

It is common practice to place a fuse in series with a static switch so that in case of excessive load the fuse will clear, thereby to protect the overall circuit. For instance, it is known from U.S. Pat. No. 3,466,527 of Chun that, when the transformer saturates, a surge of current is drawn from the input source, in which case the surge activates the fuse to disconnect and protect the circuit.

It is also known from U.S. Pat. No. 3,611,330 of R. A. Colossa to anticipate saturation of a saturable core used in an inverter circuit in order to switch off the application of power to the primary windings thereby to afford an early prevention of any rapidly increasing short circuit currents. The preventative action, there, results from the detection of impending saturation.

The present invention still relies on conventional protection in the event of an excessive current, by fuse for instance, but the concern here is with preventing saturation of the primary of the transformer rather than sensing its first manifestation thereby to provide a real fault anticipation scheme by detecting the cause of saturation.

The invention stems from the realization that saturation of the primary of the transformer is the result of a repeated discrepancy in the normally symmetrical and alternating cycling of the magnetic hysteresis characteristic of the magnetic core of the transformer. On the other hand it is observed that, if such a discrepancy does exist, it is likely to be attributable to an anomalous conduction of only one of the thyristors in the bilateral switch inserted in series configuration with the primary of the transformer. Since such a discrepancy is unlikely to occur on two sides of the bilateral switch at the same time, it is reasonable to rely on the detection of an asymmetry in the mode of operation of the primary of the transformer as an indication of defective conduction in one of the paired switches.

An object of the present invention is to provide fault anticipation on any of the controlled static switches mounted in the primary side of a high current transformer power supply.

Another object of the invention is to enable prompt disconnection of a high current transformer power supply controlled by static switches connected in the primary side by detecting a fault before it saturates the transformer.

SUMMARY OF THE INVENTION

The invention relates to a high current power supply having a transformer supplying a low voltage load from an alternating current voltage source via bilateral controlled static switches controlling power through the primary of the transformer. In order to prevent saturation of the transformer if any of the switches were defective in its conduction, or if it misfired, as asymmetry in the voltage supplied to the transformer is detected at least over one cycle of the voltage as an indication of switch defective operation in anticipation of possible saturation of the transformer. Such detected indication is translated into a digital signal and used to shutdown the installation. Should saturation of the transformer have occurred, the fuses would have protected the installation. However, by merely temporarily and controllably shutting down the supply of energy to the circuit, it is possible to restart the operation either because the defect was only temporary, or after correction of the defect. The invention also provides means for locating the defective static switch to permit prompt replacement thereof or an adjustment of the firing process.

THE PREFERRED EMBODIMENT OF THE INVENTION

Figure 1:
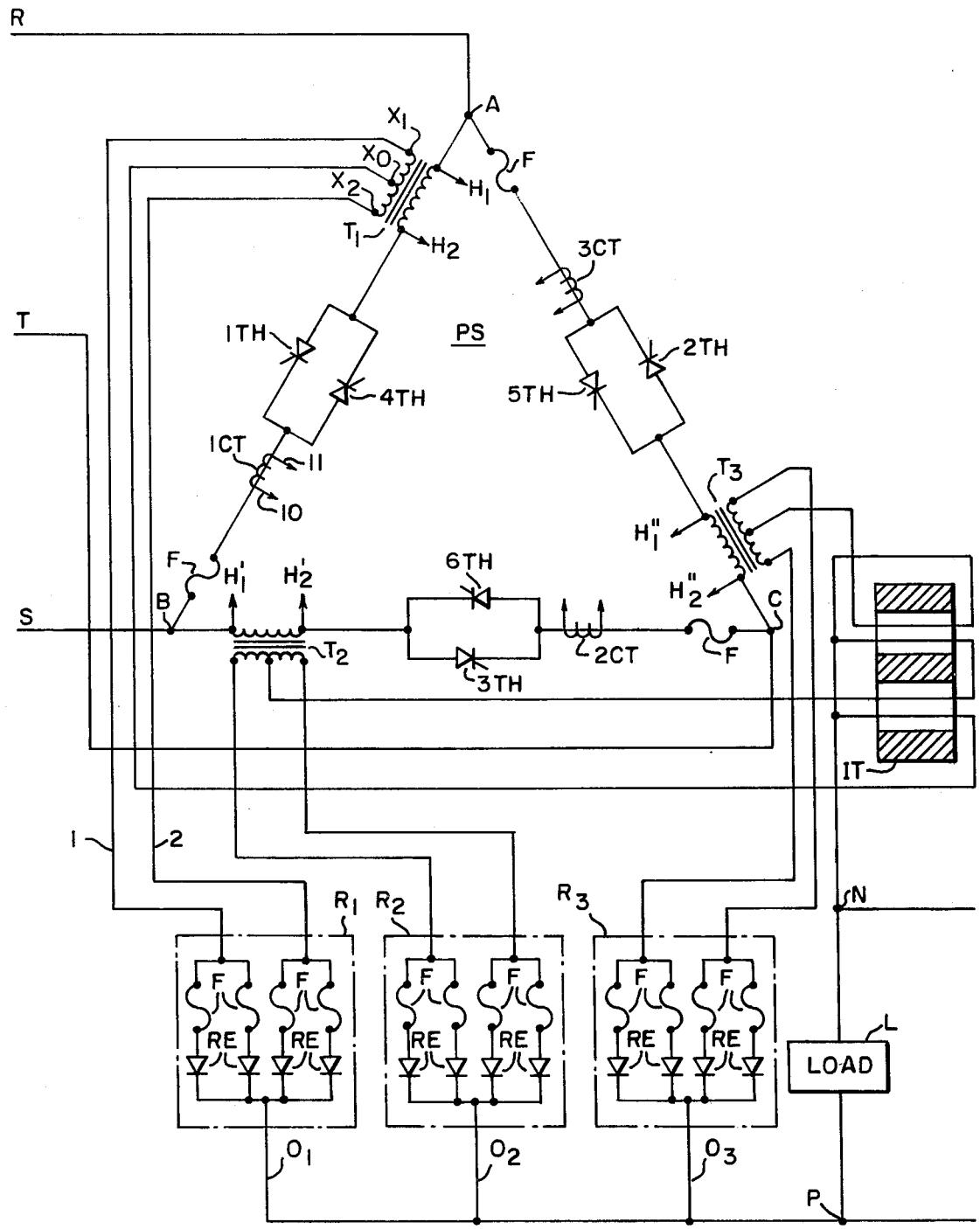
FIG. 1 provides a schematic representation of an installation supplied with high currents from a three-phase alternating current power supply to which the error detection circuit according to the invention is applicable.

Referring to FIG. 1, a portion of a power system PS is shown in which, from a three-phase network illustrated only by phase lines R, S, T, energy is supplied to three transformers $T_1$, $T_2$, $T_3$. The primary windings thereof are each connected in a delta branch and each are associated with a bilateral switch including antiparallel thyristors, such as thyristors 1TH and 4TH, connected in the branch of transformer $T_1$, e.g., between lines R and S. A fuse F, is mounted in series with each such bilateral switch and primary winding combination of a branch. The secondary windings are supplying rectifier banks $R_1$, $R_2$, $R_3$ which generate direct currents that are summed up through the load L. The secondary windings are midtapped, each half winding being connected from the winding terminals $X_1$, or $X_2$, to a corresponding half of the rectifier bank $R_1$, $R_2$, or $R_3$, via lines 1 and 2 for bank $R_1$. A plurality of rectifier elements RE are mounted in parallel in each bank in order to accommodate maximum current therethrough. The outputs $0_1$, $0_2$, $0_3$ of the three rectifier banks are summed up at the positive terminal P of load L. The midtap terminals of the secondaries of transformers $T_1$, $T_2$, $T_3$ are connected to the negative terminal N of load L, through an interphase reactor IT.

The circuit arrangement of FIG. 1 is only illustrative of one possible circuitry. Instead of the delta connection shown, the antiparallel thyristors and associated primary winding could for instance be connected in a Y arrangement between supply lines R, S, I. The operating principle of the detection circuit according to the invention would remain unaffected.

Considering the specific circuitry of FIG. 1 and the particular branch AB of the delta connection ABC, with an industrial line R.S.T., primary amperes are in fact passing through branch AB, and each thyristor of a pair such as 1TH, 4TH is passing current at 180° phase from each other. A current sensor ICT is coupled to the main conductor in branch AB in order to sense the load. From two terminals 10, 11 is derived a signal applied to the control circuitry of the associated rectifier bank $R_1$ for the purpose of balancing power between the branches. Similar sensors 2CT and 3CT are coupled to the other branches BC and AC of the delta circuit. Each power transformer $T_1$, $T_2$, $T_3$ supplies power to associated rectifier bank $R_1$, $R_2$, or $R_3$. The three branches, e.g., the three rectifier banks, add up to provide at junctions PN the load current required by the load L, which for instance consists of an aluminum melting cell.

Figure 2:
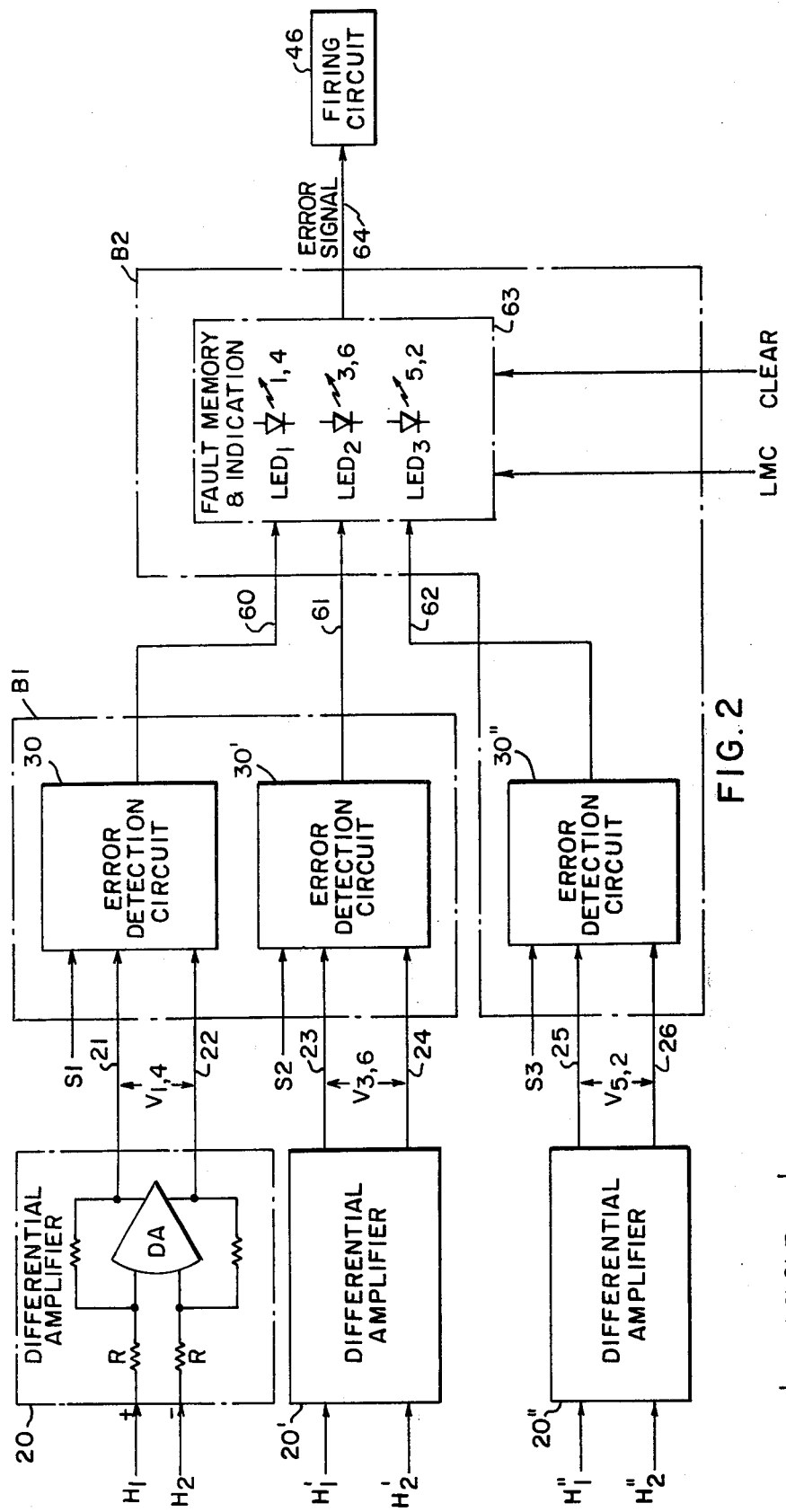
FIG. 2 illustrates three error detection circuits of the invention connected in the circuit of FIG. 1.

If, for some reason, an excessive current is drawn in any of the branches AB, BC, CA, the fuse F will clear to protect the thyristors and the transformer. It is possible, however, that without becoming so critical, some discrepancy will appear in the load of a branch which can be remedied at an early stage. It would be desirable, then, not to prolong a situation which could produce transformer saturation and cause the fuse to clear in the last resort. To this effect the terminals $H_1$, $H_2$ of the primary winding of transformer $T_1$, terminals $H_1'$, $H_2'$ of the primary winding of transformer $I_2$ and terminals $H_1''$, $H_2''$ of the primary winding of transformer $T_3$ are each connected to a high impedance amplifier device 20 (shown in FIG. 2) in the form of a differential amplifier DA for generating at its output 21, 22 a voltage $V_{1,4}$, representative of the voltage at the primary of the power transformer. A voltage signal $V_{3,6}$ is similarly derived from a differential amplifier 20' between output lines 23, 24, which is representative of the voltage at the primary of transformer $T_2$. Also, a voltage $V_{5,2}$ is obtained between lines 25, 26 at the output of a differential amplifier 20" in relation to the terminals $H_1''$, $H_2''$ of power transformer $T_3$. Signals $V_{1,4}$, $V_{3,6}$, and $V_{5,2}$ are respectively inputted into error detection circuit 30, 30' and 30" which are associated each with one branch of the delta-connected circuit of FIG. 1. As shown in FIG. 2 the error signals at the output of any of the error detection circuits 30, 30', 30" are inputted via respective lines 60, 61, 62 into a fault memory and indication circuit 63 which includes LED indicators LED1, LED2, LED3 associated with the respective bilateral switches 1TH, 4TH; 3TH, 6TH; and 5TH, 2TH). Any error so detected and displayed is also derived on the line 64 and applied to the firing circuit 66 which is part of the power system and normally determines the conduction of the thyristors 1TH - 6TH in sequence and cyclically as generally known. The signal on line 66 causes a shut down of the system operation.

Figure 3:
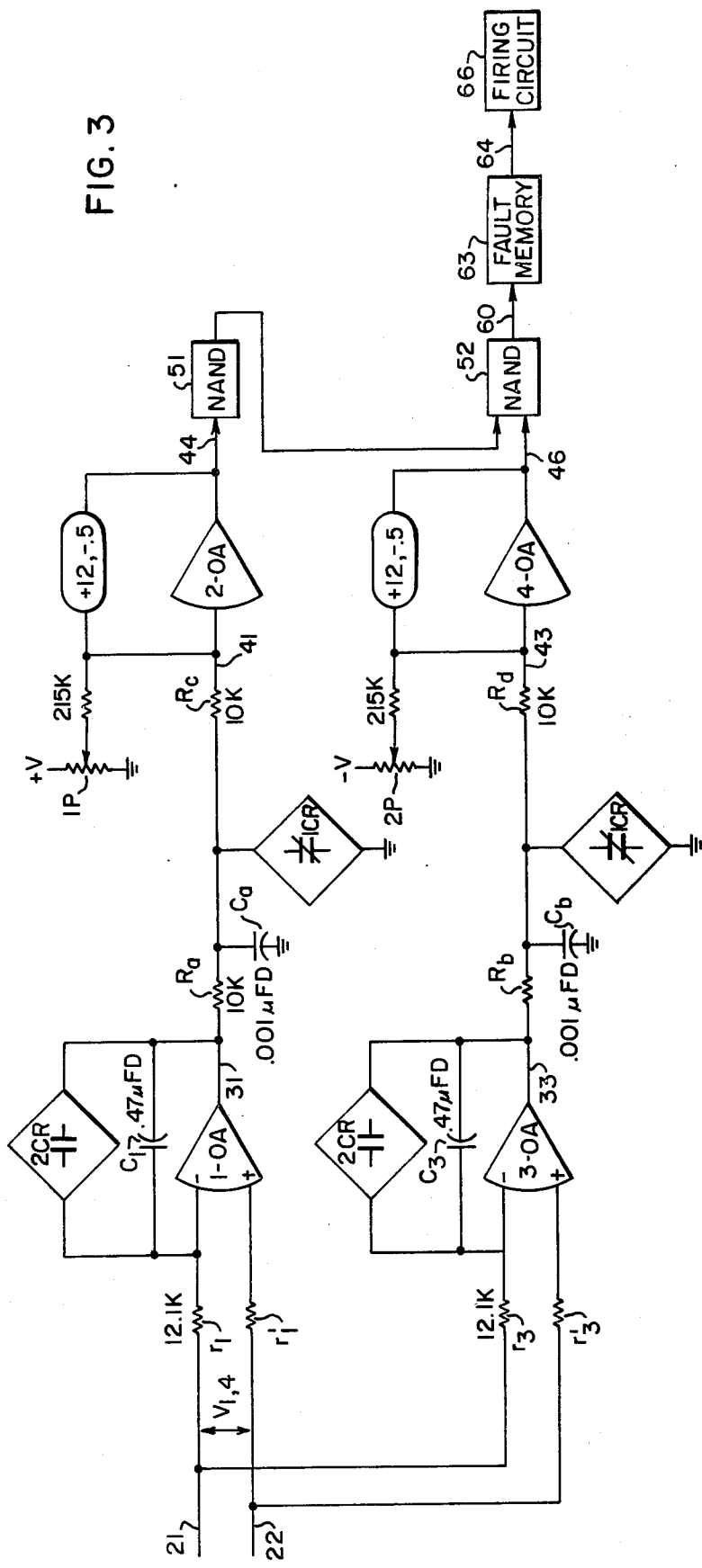
FIG. 3 shows illustratively an error detection circuit according to the present invention.

Referring to FIG. 3, one error detection circuit, namely 30 for branch AB, is shown with specificity. Differential outputs 21, 22 are applied via respective resistors $r_1$, $r_1'$, and $r_3'$ in parallel to respective inputs of operational amplifiers 1-OA, 3-OA when 1-OA and 3-OA are integrators with a time constant defined by feedback capacitor $C_1$ and resistor $r_1$, for 1-OA; $C_3$ and $r_3$ for 3-OA. Operational amplifiers 1-OA and 3-OA in fact integrate over each cycle of operation the transformer $T_1$ primary voltage.

Figure 4:
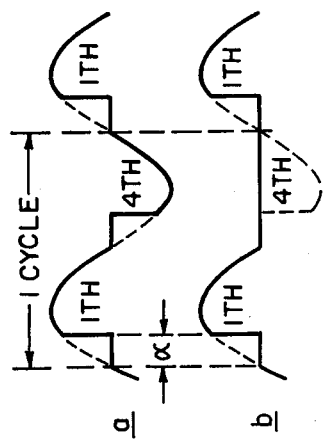
FIG. 4 gives separate curves of the primary voltage in any of the transformers of FIG. 1, one in the normal, the other in the faulty situation.

Referring to FIG. 4, curve (a) represents the transformer primary voltage of $T_1$, in the normal operation condition. $\alpha$ is the firing angle. Curve (a) is symmetrical about the abscissa axis assuming thyristor 1TH for the positive side and thyristor 4TH for the negative side carry exactly the same load under exactly the same firing angle. In contrast, curve (b) presents a discrepancy due to a misfiring of thyristor 4TH at one time of the cycle. A dissymmetry may also happen if the firing angles $\alpha$ set by the firing control circuit is excessively different for one polarity (for instance 1TH) from what it is for the opposite polarity (for instance 4TH). It is clear that in a situation such as with curve (b) of FIG. 4, the integration output of 1-OA or 3-OA at the end of each cycle will no longer be close to zero. In a case of symmetry the deviations shown by curve (a) will balance out through a complete cycle and no appreciable output will be generated by either 1-OA or 3-OA. In the case of curve (b) both integrator amplifiers will detect an error which will appear at the output. Not any error, however, is worth being detected. A fault indication is generated only if the error at the end of a cycle is greater than an allowed tolerance band. Such tolerance band is so selected that an error signal on line 46 would be generated only if the rate of change of $\alpha$ has become too large, or if a thyristor actually fails altogether to gate for some reason. In such event, a fault indication is generated. In response to such error signal appearing on line 46 suitable means are actuated to shut down the firing gating system. In this fashion an improper condition of firing or, of operation of thyristor 1TH or 4TH of a bilateral pair will have been detected and continuation of such faulty condition in the circuit, will have been prevented. Indeed, should the situation typified by curve (b) on FIG. 4 last for several cycles, the core of transformer $T_1$ will eventually go to saturation. Once saturation has occurred, the winding impedance disappears and the AB branch between lines R and T carries an inrush current which will clear the fuse F.

Referring to FIG. 3, it will now be explained how integration is made by integrator 1-OA, or integrator 3-OA, belonging to error detection circuit 30 over a complete cycle to implement protective action on the overall circuit.

From one phase of the 60 hertz supply line R.S.T., is derived on line 6, a synchronizing signal $S_1$ relative to thyristors 1TH, 4TH, which is applied to a pulse generator $PG_1$ generating on line 7 a pulse signal having 120 $\mu$S duration, and on line 8 signal derived from $PG_1$ is applied to a second pulse generator $PG_2$ which generates at the output on line 9 a pulse signal having a duration of 240 $\mu$S. The pulse signal on line 7 is applied to a static relay 1CR break contacts. The pulse signal on line 9 is applied to a static relay 2CR having make contacts.

The output from 1-OA is applied via line 31 and through a filter, comprising series resistors Ra and Rc and parallel capacitor Ca, to the input of a comparator 2-OA. Similarly, the output from integrator 3-OA is applied via line 33, and through a filter $R_b$, $R_d$, $C_b$, to the input of a second comparator 4-OA. The break contacts of static relay 1CR normally short circuit the inputs to comparators 2-OA and 4-OA.

When static relay 1CR is energized the break contacts of the relay are opened, namely during 120 $\mu$s. When static relay 1CR is deenergized, namely at the end of the 120 $\mu$s period, the contacts of 1CR are again closed, e.g., the inputs to operational amplifiers 2-OA and 4-OA are short-circuited so that no error is being detected. At the same time the signal on line 8 causes a pulse to be generated on line 9 from pulse generator PG2. As a result static relay 2CR is being energized and make contacts of 2CR short circuit capacitors $C_1$ and C₃, thus discharging the charges accumulated during the preceding integration period in each integrator circuit. The fault anticipation scheme integrates the transformer primary voltage over each cycle of operation. If the net error at the end of the cycle is greater than an allowed tolerance band, a fault indication is generated and the system is prevented from further gating. If the rate of change α is too large, an error signal would be generated. If a thyristor fails to gate for some reason, an error signal would be generated.

The synchronizing signal S1 is taken from the gating system of the thyristors. S1 goes positive in time relationship during a 10° (463 μ secs) interval occuring just before α = 0 for the 1TH thyristor. A 120 μ s pulse is generated which energizes static relay 1CR for such time interval. 2-OA and 4-OA are used as comparators. When 1CR is energized, any error signal from 1-OA or 3-OA is applied to the appropriate comparator through a 5 μ s filter (Ra, Rc, Ca or Rb, Rd, Cb). 1P and 2P are potentiometers set at the same level in order to provide for an allowable band of operation of the error detection by comparators 2-OA, 4-OA. If the error voltage from the integrating amplifiers 1-OA, 3-OA exceeds the allowable band, the comparator outputs switch. As a result, NAND devices 51, 52 connected in the respective outputs 44 and 46 provide positive output signals. The output from NAND device 51 is inputted as second input to NAND device 52. The output from NAND device 52 is applied via line 60 to the fault memory device 63 which in turn generates a control signal applied to the firing circuit 66 via line 54 so that shut down of the operation can be effected. Two integrating amplifiers are required because the error can be either positive or negative. Comparator 2-OA is used for negative errors, comparator 4-OA is used for positive errors. At the end of the 120 μ s interval 1CR is deenergized thus blocking again the error input signals to the comparators. At the same time the second pulse circuit PG2 is activated. This creates a 250 μ sec interval for energizing static relay 2CR. During such interval, the integrating amplifiers are reset for zero volts. When 2CR deenergizes, which occurs approximately 2° before α = 0, make contacts 2CR are opened and the integrating amplifiers 1-OA, 3-OA are set for the next cycle.

Three identical circuits mounted on boards B1, B2 as shown on FIG. 2 are required for the three phases in delta. Appropriate synchronizing voltages and transduced transformer voltages are applied. The three error output lines 60, 61, 62 are applied to fault memory circuits. When a fault is detected, a flip flop is set and an appropriate indicator LED1, LED2, LED3 is lit. The indicators are designated 1,4 3,6 5,2 for 1th, 4th, 3th, 6tth and 5th and 2th to provide clarifying information on the source of the fault. A high logic signal output is generated when a fault occurs. When the system is reset, a clear signal must be brought in to clear the fault memory circuits. A signal LMC applied to board B2 is used to inhibit the circuitry when no gating is being generated by firing circuit 66.

For other types of faults for instance if a spurious gate pulse is generated which fires a thyristor which in turn generates excessive inrush current, the thyristor fuse will clear. To prevent the fuse from clearing some means of limiting inrush currents may be provided. For missing gate pulses or thyristors failing to turn on, however, the circuit according to the present invention will prevent transformer saturation.

Firing pulse generating schemes for firing thyristors are well known. Therefore, description of a particular circuitry as can be used to control conduction in the proper sequence and for the desired conduction angle of thyristors 1-TH through 6-TH of FIG. 1, or for that matter of any other thyristor arrangement in a power supply to be protected by the present invention, is not deemed necessary. This can be left to the man skilled in the art.

It is sufficient, for the purpose of the present description of the invention to refer to chapter 10 and the bibliographic reference there given, of "Thyristor Phase-Controlled Converters and Cycloconverters" by B. R. Pelly, edited by Wiley-Interscience in 1971, which provides a modern and authoritative description of this particular art.

What we claim is:

1. A protective circuit for a power supply including an alternating current power source coupled to at least one bilateral controlled static power switch mounted in the primary of a transformer stage comprising:

means for detecting a voltage unbalance condition in said transformer primary for generating an error signal characteristic of said unbalance; and means operative in relation to said error signal for preventing damage to said power supply as a result from said unbalance; with said detecting means including means for integrating said unbalance condition over at least one cycle of said voltage alternating current power source.

2. The protective circuit of claim 1 with said power source including means for firing said bilateral switch in sequence and in synchronization with the voltage of said higher voltage alternating current power source to control power to said low voltage load; said integrating means including means responsive to said firing means for generating a synchronization signal; said integrating means being operative with said synchronization signal to define a period of integration which is at least one cycle of said power source voltage.

3. The protective circuit of claim 2 with means for resetting said integrating means at the end of said period and means for setting said integrating means at the beginning of said period.

4. The protective circuit of claim 3 including dead band means for establishing a dead band of operation of said detecting means in relation to a minimum level of said unbalance condition.

5. The protective circuit of claim 4 including means for storing said error signal in a digital form, said operative means being controlled digitally.

6. The protective circuit of claim 5 including means for signaling said unbalance in response to said stored error signal.

7. The protective circuit of claim 6 with said detecting means providing an error signal having a sign depending upon the direction of said unbalance condition.

8. The protective circuit of claim 7 with the sign of said unbalance being related to defective operation of one of the alternate paths of said bilateral switch.

9. The protective circuit of claim 8 with said firing means being controlled by said operative means in relation to said error signal and in relation with the defective path in said bilateral switch.

* * * * *